United States Patent [19]

Smith

[11] 3,797,639

[45] Mar. 19, 1974

[54] MACHINE FOR ORIENTING PEARS

[75] Inventor: Laurence H. Smith, Lafayette, Calif.

[73] Assignee: Atlas Pacific Engineering Company, Emeryville, Calif.

[22] Filed: June 28, 1972

[21] Appl. No.: 267,017

[52] U.S. Cl. .......................... 198/33 AA, 193/43 R
[51] Int. Cl. ............................................ B65g 47/24
[58] Field of Search ................ 198/33 AA, DIG. 12; 193/43 R, 43 A, 43 B, 43 C, 43 D, 7, 2

[56] References Cited
UNITED STATES PATENTS

| | | | |
|---|---|---|---|
| 3,225,892 | 12/1965 | Keesling | 198/33 AA |
| 3,598,223 | 8/1971 | Laver | 198/33 AA |
| 3,126,993 | 3/1964 | Van Der Schoot | 198/33 AA |
| 2,471,479 | 5/1949 | Coons | 198/33 AA |
| 3,273,615 | 9/1966 | Aguilar | 198/33 AA |
| 3,252,560 | 5/1966 | Chamberlin | 198/33 AA |
| 3,357,538 | 12/1967 | Chamberlin | 198/33 AA |
| 3,217,857 | 11/1965 | Ellis et al. | 198/33 AA |
| 2,818,160 | 12/1957 | Lamouria | 193/43 R |
| 3,487,904 | 1/1970 | Aguilar | 198/33 AA |
| 3,513,956 | 5/1970 | Rayment | 193/43 R |

*Primary Examiner*—Evon C. Blunk
*Assistant Examiner*—Joseph E. Valenza

[57] ABSTRACT

Means are provided for receiving the pears in bulk and for feeding these in single file to a pear orienting means which positions each pear in a vertical position in which the stem end of the pear is lowermost. In this position the pears are fed into a conical cup as shown at 65 in FIG. 3 in U.S. Pat. No. 3,018,179. Following placement in the vertically positioned conical cup, the pear is grasped by the pear gripping pads 71 after which the cup is moved 90° to a horizontal position in which the pear is moved toward a core tube on which it is impaled for peeling and coring by mechanism as shown in the aforementioned patent and in U.S. Pat. Nos. 3,055,408 and 3,058,502.

14 Claims, 29 Drawing Figures

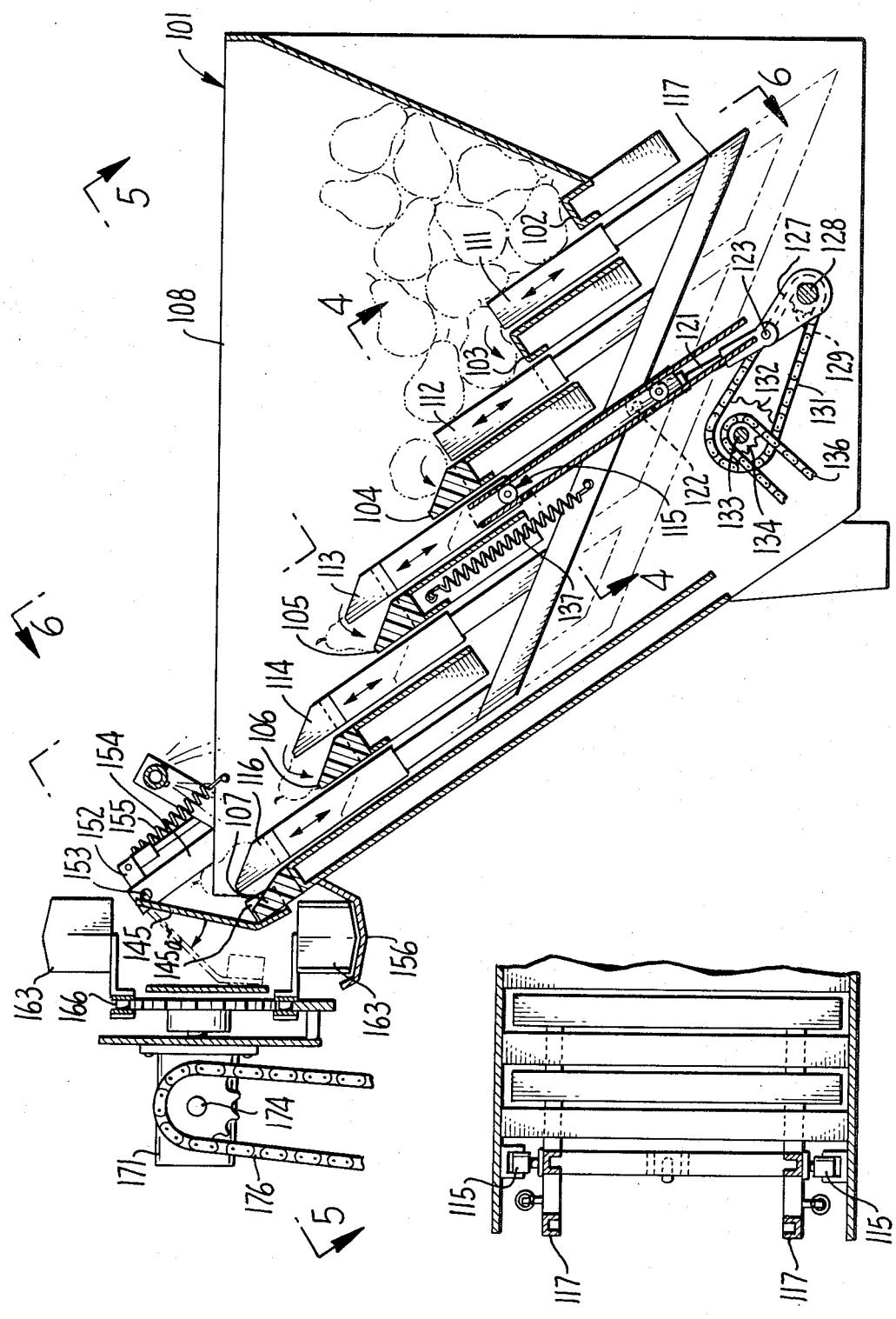

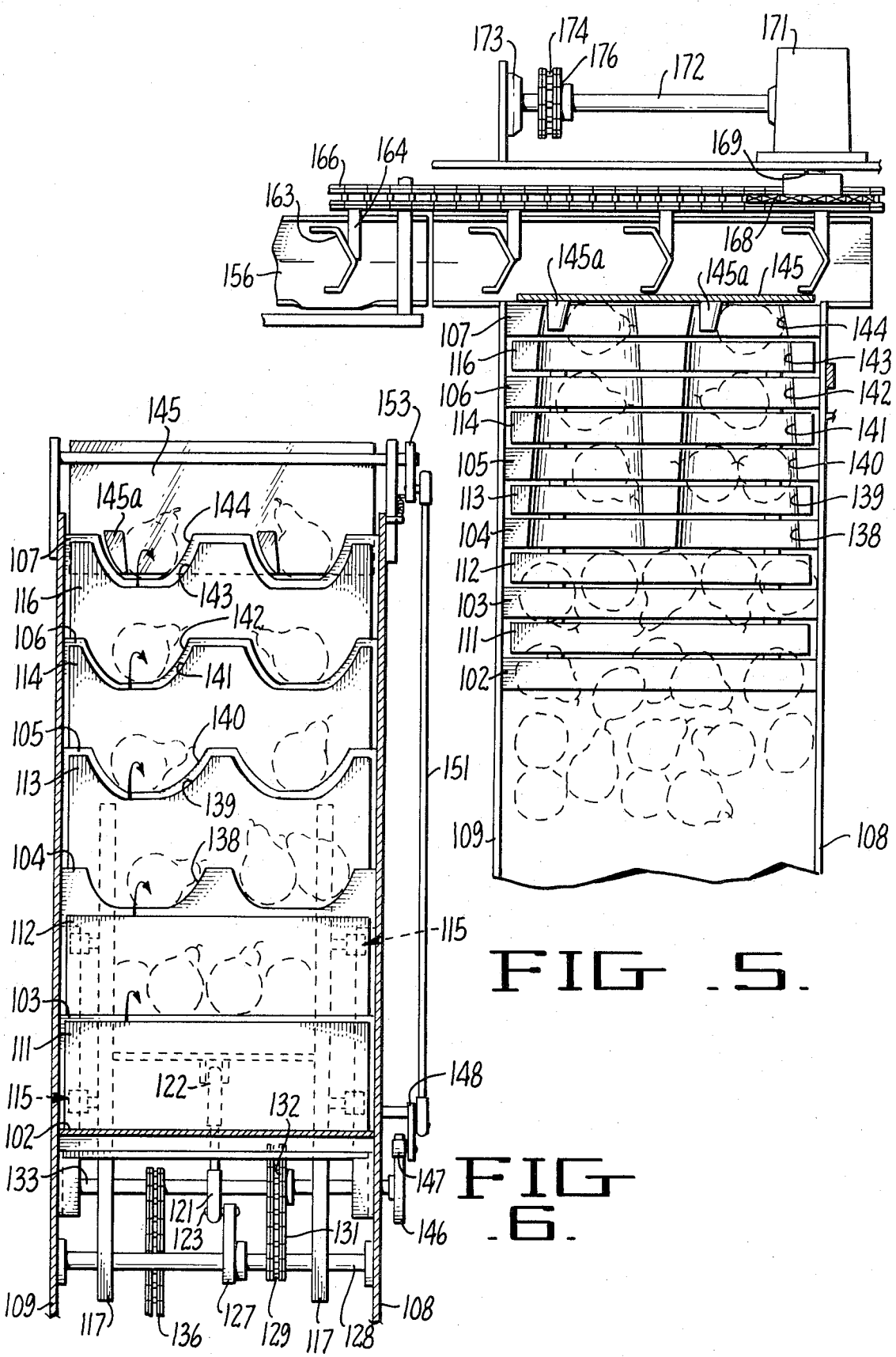

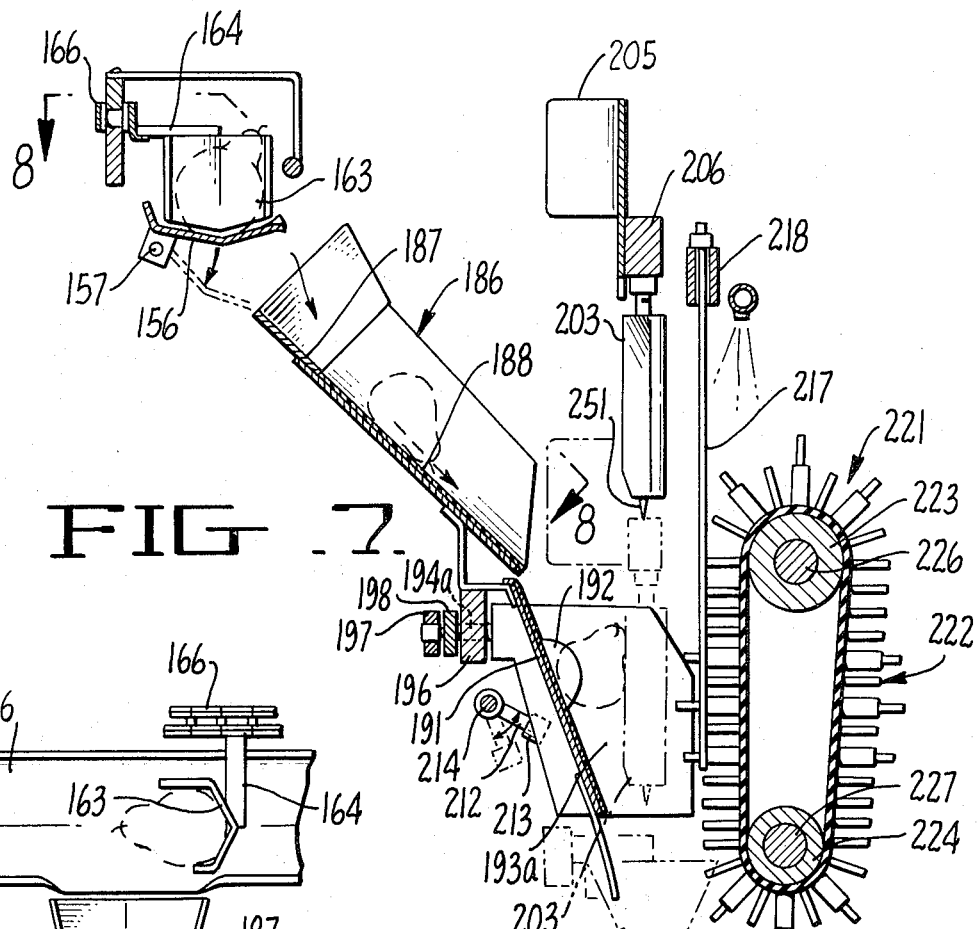
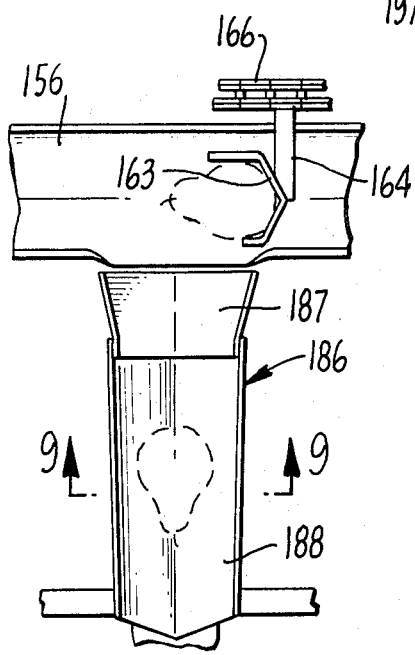
FIG. 7.
FIG. 8.
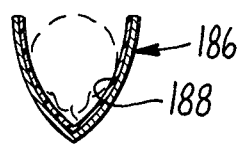
FIG. 9.

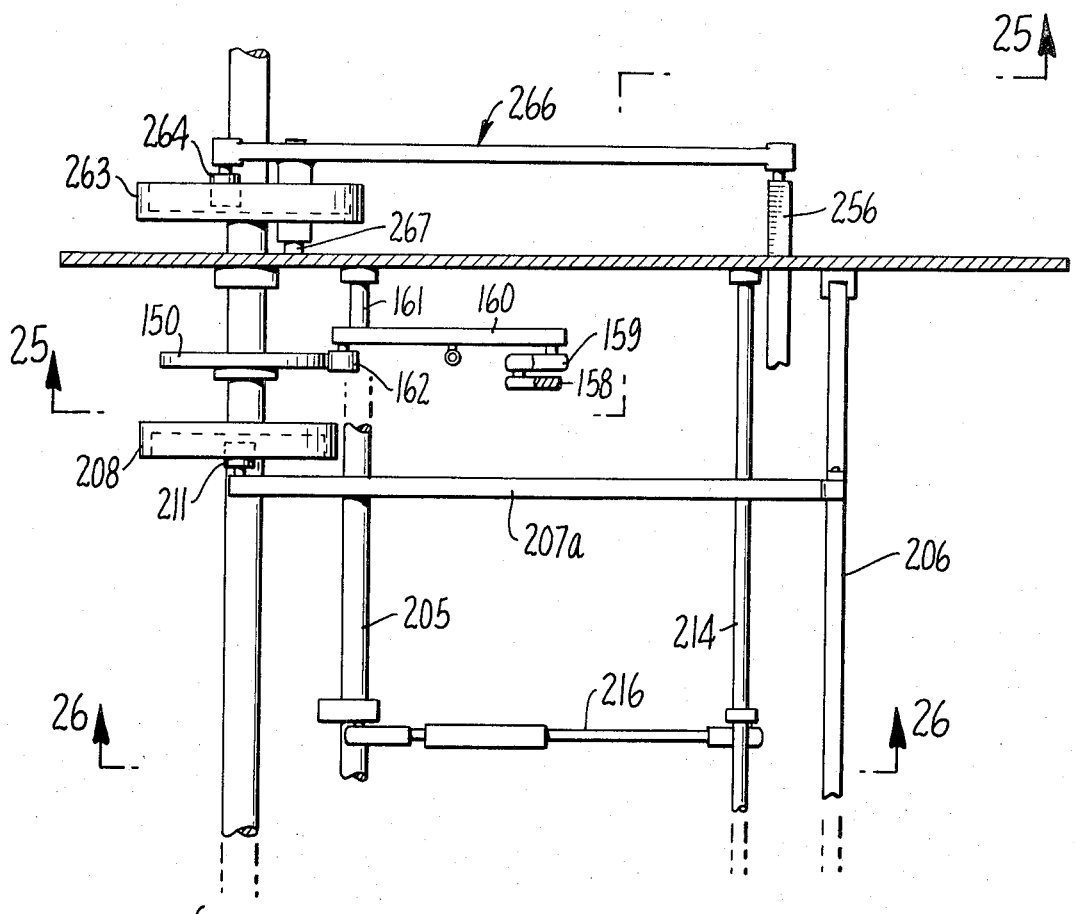
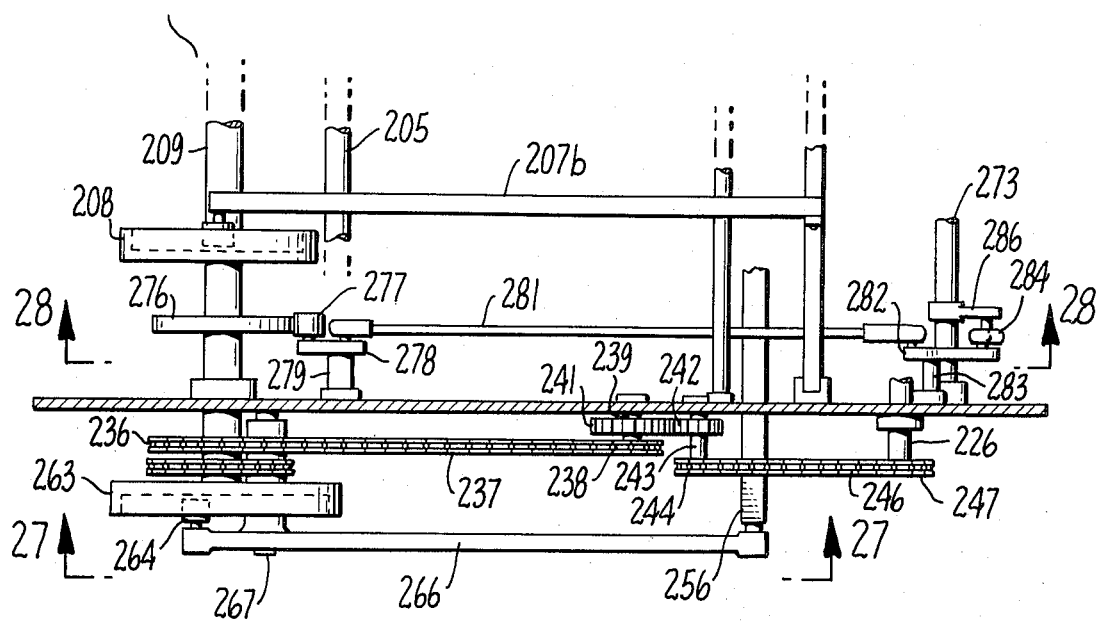
FIG. 24.

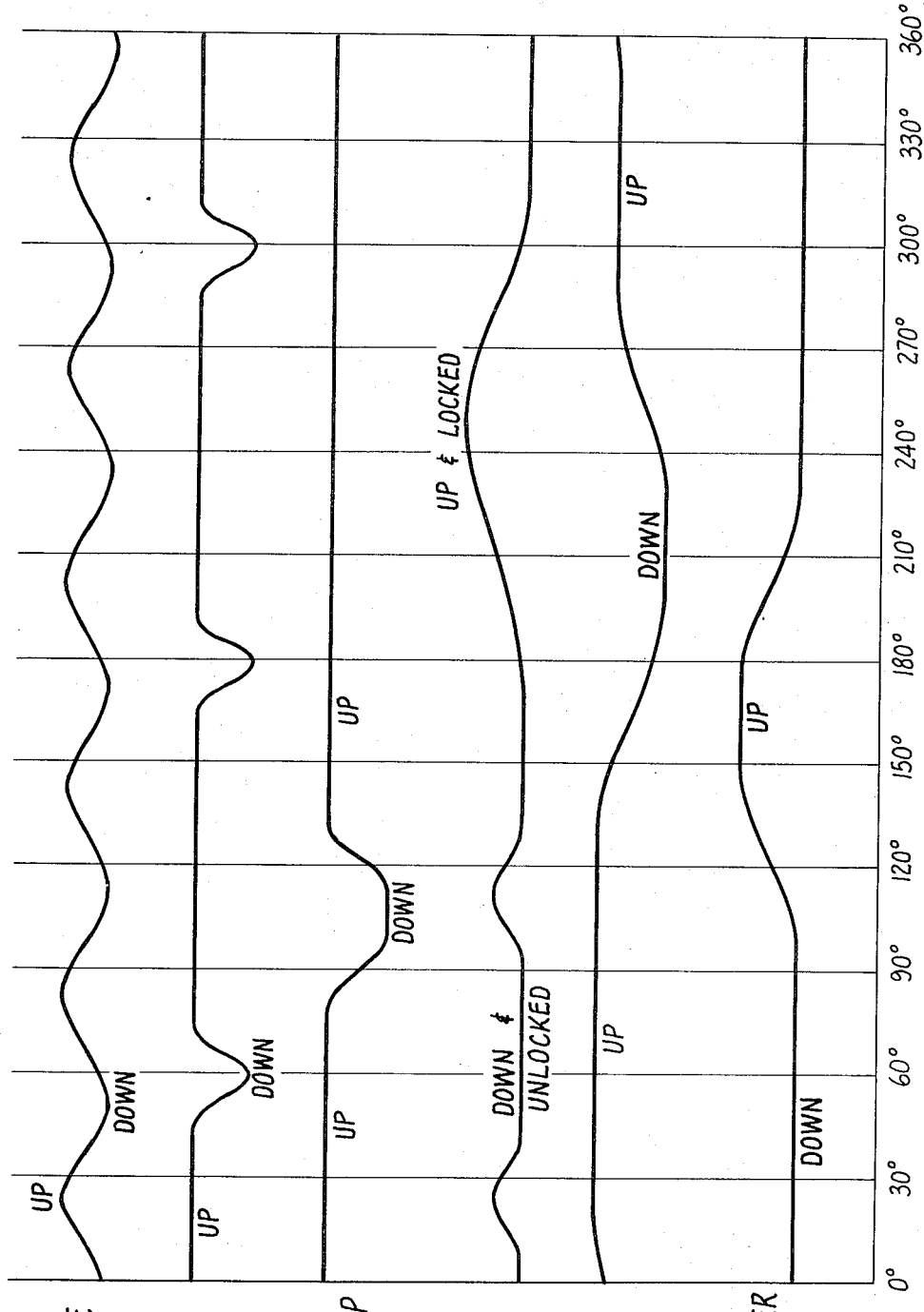

3,797,639

MACHINE FOR ORIENTING PEARS

BACKGROUND OF THE INVENTION

Heretofore pears have been fed to the pear peeling and coring machine either by hand placement or by a machine such as is shown in my prior U.S. Pat. No. 3,144,121. That placement requires that the person feeding the pears be quite dexterous, and unless each cup in the machine is filled with a pear, the output from the machine is reduced.

The machine of my prior U.S. Pat. No. 3,144,121 has been used with substantial success; however, unless it was maintained in exact adjustment, accurate orientation could not always be assured. Further, to be totally effective that machine required that the pears be truly pear-shaped, an attribute which nature did not always observe, for many pears are more nearly spherical than of the shape usually associated with that of a pear, otherwise the percentage of orientation was less than 100 percent.

In summary, it is an object of the present invention to provide a pear orienting machine which will successfully and accurately orient pears into a given position irrespective of their shape.

In addition, it is an object of this invention to provide a pear orienting machine which operates successfully even though the pears still have their stems attached.

A further object of the present invention is to provide a pear feeding mechanism which advances the pears at a rate in excess of that in which the pears can be accepted by the peeling and coring mechanisms so that the filling of each of the conical cups in the peeling and coring machine is assured.

BRIEF DESCRIPTION OF THE DRAWINGS

FIG. 3 is a side elevation taken through the bin into which the pears are fed in bulk and from which they are transferred one at a time by a shuffle feed mechanism.

FIGS. 4, 5 and 6 are, respectively, sections taken along the section lines 4—4, 5—5 and 6—6 in FIG. 3.

FIG. 7 is a section taken through the conveyor mechanism utilized to feed the pears to the orienting mechanism shown in this view taken along line 7—7 in FIG. 1.

FIG. 8 is a section taken along line 8—8 in FIG. 7.

FIG. 9 is a section taken along the line 9—9 in FIG. 8.

FIGS. 11 through 13, 15 and 16 are respectively, sections taken along the section lines 11—11, 12—12, 13—13, 15—15 and 16—16 in FIG. 10, while

FIG. 24 is a view taken along the line 24—24 in FIG. 22.

FIG. 29 is a schematic timing chart showing the movement of the various elements to 360° rotational cycles.

DESCRIPTION OF THE PREFERRED EMBODIMENT

Figure 1:
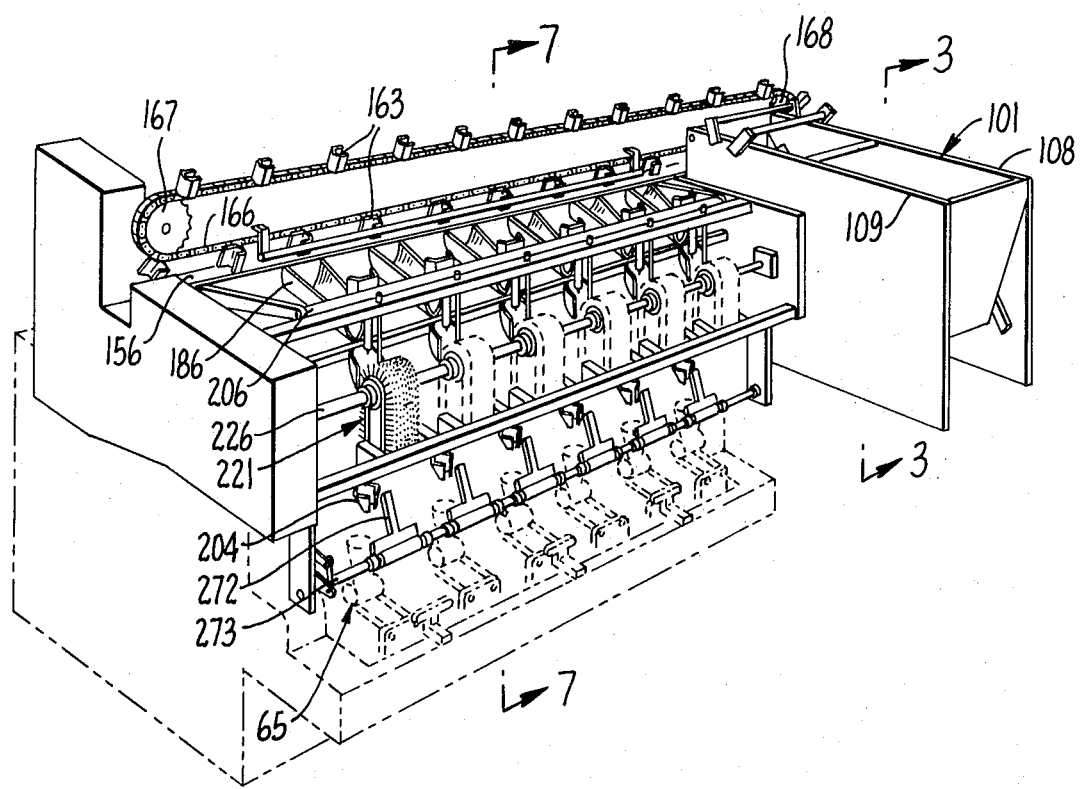
FIG. 1 is a perspective view of the complete machine showing the feeding orienting mechanism in relation to the means utilized to carry the pears into the peeling and coring portion of the machine.
Figure 2:
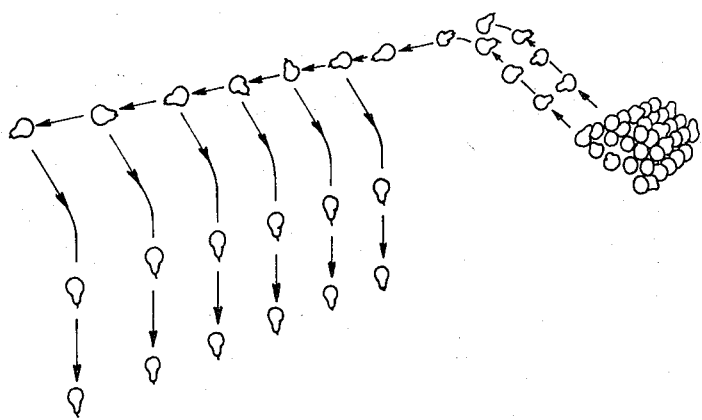
FIG. 2 is a diagrammatic view illustrating the several steps involved in the flow of the pears from the bulk supply to their final oriented position.
Figure 10:
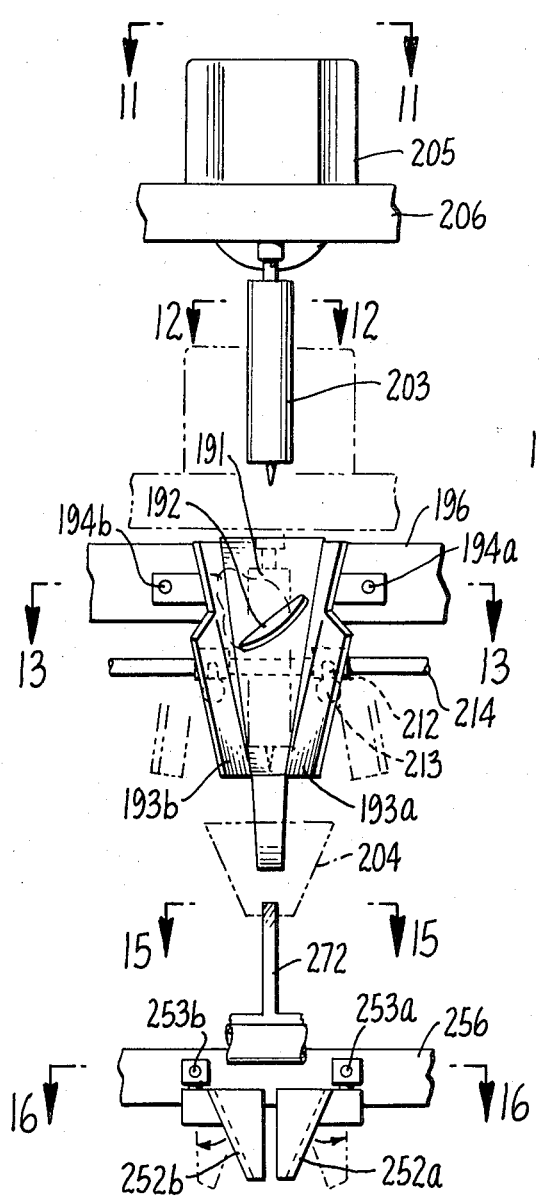
FIG. 10 is a front view partly in section showing the orienting mechanism in conjunction with the mechanism utilized to move an oriented pear toward the final conical cup.
Figure 15:
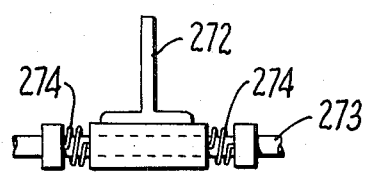
Figure 11:
Figure 13:
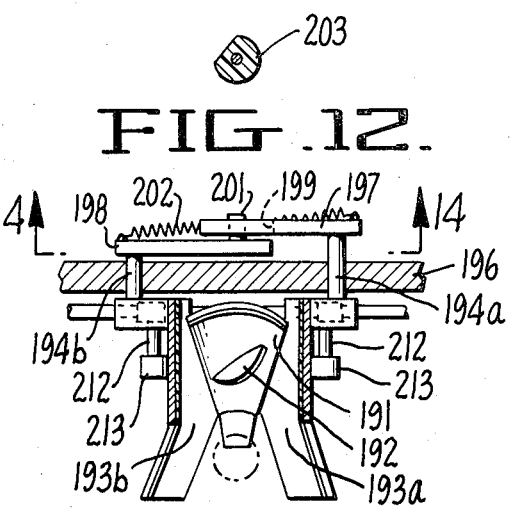
Figure 14:
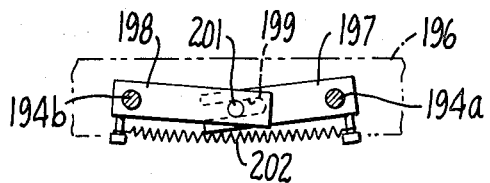
FIG. 14 is a section taken along the line 14—14 in FIG. 13.

Before proceeding to a detailed description of the machine and its several components, the following general disclosure will be made.

Pears are dumped into a bin from which they are fed by a "shuffle feed." This comprises a plurality of members which reciprocate back and forth over a plurality of fixed members to raise a pear from a lower elevation in the bin to a point of discharge. The lower reciprocating members each have a straight horizontal face, while the upper reciprocating members have indentations which diminish in size so that the topmost member has two indentations approximating the size of a large pear. Since small as well as large pears must be dealt with, the problem is presented of two small pears occupying the place of one large pear or a large pear "bridging" the discharge. This is prevented by having a gate closing the end of the "shuffle feed" and being moved back and forth, timed with the machine, through an angle of about 45° from a closed to an open position. The gate has restrictions on it, being to the left of the discharge openings and being effective to prevent two pears from being fed at the same time, or a large pear from bridging. The discharge space is restricted to keep pears from doubling in the top indentation of the "shuffle feed." If a large pear does bridge, the opening gate, by retracting the restrictions, will allow the pear to discharge properly.

To ensure maximum feeding efficiency, the "shuffle feed" is run at double the speed of the machine. Pears fed up the steps of the "shuffle feed" are placed in the indentation of the upper member at the same time the pears are restricted from being transferred to the feed shelf by the hinged gate. Because of the double speed of the "shuffle feed," the feed has two chances to fill the indentations during each cycle. If a pear is fed into one of the upper indentations during the first stroke, the next pear will travel up to the indentation; but since it cannot fall into the indentation, it will return with the feed member and again be presented to the upper indentation on the next upward stroke. After the hinged gate has released its pears to the cross-conveyor, the next pears can be received by the upper indentations, thus ensuring that every operating mechanism of the machine is fed.

The pears are discharged onto a shelf which extends upwardly at an angle of about 2°-3° to the horizontal, this being sufficient to force a pear to ride against a conveying pushing member and not roll forward in advance of the pusher.

When it is desired to feed the pears into the orienting mechanism prior to their being oriented and later peeled and cored, the shelf on which the pears ride pivots downward so each pear rolls forwardly at an angle of about 35°. This chute is made of stainless steel and is left bare at its upper end while the lower portion is covered with Teflon. If the chute is made entirely of stainless steel, the pears will not slide in an oriented position, that is, stem forward. Instead, the pears will either hang up on the stainless steel, or, if the chute is at a steeper angle, the pears will tumble end over end down the chute in a random manner. With the upper quarter made of stainless steel and the remainder coated with Teflon, enough friction is presented by the stainless steel to allow gravity to turn the pear stem downward and forward. The Teflon portion then allows the pear to slide in a predictable stem-forward manner to the orienting unit.

When the pears exit from the chute, they enter the orienting unit. This unit consists of an inverted conical concave back piece with an eliptical, angled pivot plate, which is mounted near the top, two side plates, a belt with a plurality of flexible projections extending outwardly from the face of the belt, a movable rod, and a plunger with a concave face with a small, short, sharp rod in the center.

As the pears exit from the chute, their momentum is stopped by the plunger, which is in its downstroke, having just ejected the pear to the transfer cup from the previous cycle. If the pear exits from the chute stem first, it will slide smoothly between the eliptical pivot plate and the plunger, hanging momentarily between the two as the plunger is retracted to its top position. When the plunger retracts above the pear, the pear will slide below the pivot plate and rest in the inverted conical section. The pear is held firmly by the back portion of the conical section and the two side plates and the rod in the moving belt. If the pears exit from the chute bulb end first, the pear will rest on the pivot plate stem up, supported by the plunger and the orienting mechanism. As the plunger retracts to its top position, the pear will turn to either side of the plunger and pivot gently off the pivot plate, assisted by the elongated fingers of the moving belt, with its stem down, seating itself in the lower section of the orienting unit.

If the pear, for some reason, does not orient in the chute or turn and orient off the pivot plate, it will come to rest in the inverted conical section below the pivot plate. Here the pear will be rubbed by the elongated fingers of the orienting belt and will pivot on the bulb of the pear until the stem turns downward.

If the pear should rotate from a completely misoriented position, that is, bulb down, and the neck of the pear comes to rest against the depending rod, the rod, being moved laterally back and forth about one-half inch by the offset slots in the center of the belt, will dislodge the neck of the pear from resting against the rod, stem up, in a misoriented position. With the pear resting against the rod, the conical back section and side plates, the pear will be engaged by one or more of the projections on the movable belt. The effect of the engagement with the moving belt is to turn the pear from its vertical stem up position to a vertical stem down position.

The pin is provided in the end of the plunger to guide the pear from the orienting unit into the transfer cup, thus ensuring that there is no lateral movement and chance of misorientation in transfer.

At the end of the orienting cycle, the plunger descends and pushes the pear downward to engage the three spring-loaded sections of the orienting unit.

In the specific machine, pears are fed in bulk into a hopper 101 which is shown on he righthand side of perspective view FIG. 1. A section through the hopper is shown in FIG. 3, wherein the details of the "shuffle feed" are set forth. The "shuffle feed" is achieved by providing a plurality of fixed elements 102, 103, 104, 105, 106 and 107, which extend transversely between the opposite side walls 108 and 109 of the bin.

Figure 23:
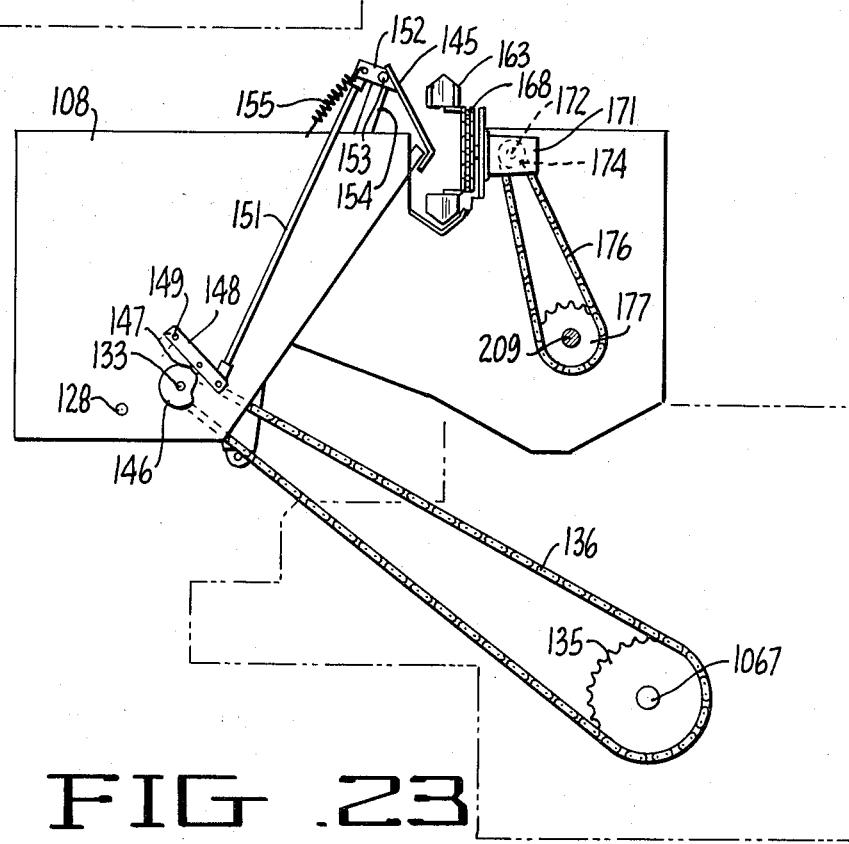
FIG. 23 is a fragmentary side elevation of another portion of the drive mechanism.

Mounted for reciprocating motion between adjacent pairs of the fixed elements are slidable elements 111, 112, 113, 114 and 116. Each of the movable elements 111, 112, 113, 114 and 116 is mounted by arms 117 which re slidably carried by track and roller assemblies 115 between opposite frame members 108 and 109. Movable element 113 is also connected by a link 121, which is pivoted on the movable member 113 by pin 122, at one end of the link, while the other end of the link is pivoted as at 123 to an eccentric arm 127 which, in turn, is mounted on shaft 128. Shaft 128 carries a sprocket 129 about which chain 131 is trained. The chain 131 also passes about another sprocket 132, mounted on a shaft 133 which shaft also carries sprocket 134. Chain 136 is trained over sprocket 134 and about a sprocket 135 (FIG. 23) mounted on the main drive shaft 1067 of the pear peeling and coring machine as shown in FIG. 1 of patent 3,058,502.

Returning briefly to the shuffle feed mechanism, a spring 137 is extended between stationary member 105 and arm member 117 to bias the various slidable elements with respect to the fixed elements.

Referring particularly to FIG. 6, it is to be noted that elements 104, 113, 105, 114, 106, 116 and 107 are each recessed at their upper ends, such areas being designated as 138, 139, 140, 141, 142, 143 and 144. The size of the successive recesses is reduced to approximately the size of a large pear. With a normal sized pear, only a single pear will be present in the recess 143 in the uppermost slidable member 116. To deal with the problem of small pears occupying the place of one large pear, or a large pear bridging the discharge, I provide a gate 145 closing the end of the "shuffle feed" and being moved back and forth through an angle of about 45° from a closed to an open position by means presently to be disclosed. The gate also includes two restrictions 145a to the left of each of the two discharge openings, these being effective to prevent two pears from being fed at the same time from a single opening and to prevent a large pear from bridging the opening. Thus, the discharge space is restricted to keep pears from doubling at the top indentation of the "shuffle feed" and, if a large pear does bridge, the opening gate will remove the restriction and allow the pear to discharge properly.

The gate is manipulated between its open and closed positions by a cam 146 mounted on shaft 133. A cam follower 147 (see FIG. 25) is mounted upon a lever 148 intermediate the end thereof, which has one end pivoted as at 149. The other end of lever 148 carries a rod link 151 which extends to one end of lever 152 on which gate 145 is mounted. The lever is pivoted on rod 153 which extends across the top of the bin between supports 154 mounted on the opposite sides of the bin. The rod supports the gate while a spring 155 extends between the end of the lever 152 and the bin to bias the gate into its closed position.

To ensure maximum feeding efficiency, the "shuffle feed" is run at double the speed of the machine. The net result is that pears fed up the steps of the "shuffle feed" are placed in the indentations of the upper member at the same time that pears are being restricted from being transferred to the feed shelf by the hinged gate. Thus, the feed is able to fill the final indentation during each cycle.

Figure 25:
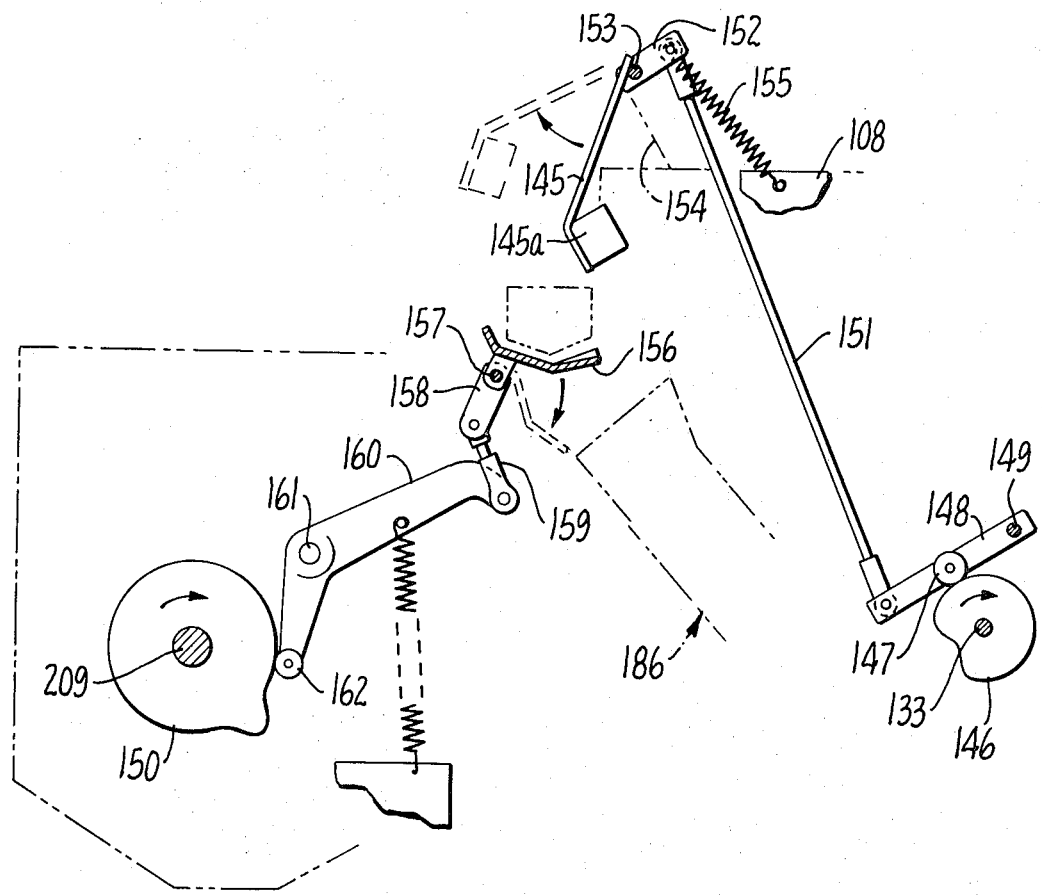
FIGS. 25, 26, 27 and 28 are, respectively, sections taken along the lines 25—25, 26—26, 27—27 and 28—28 in FIG. 24.

Pears discharged from the "shuffle feed" and released by gate 145 fall onto a shelf 156. A portion of shelf 156 is hinged at the back of the machine as at 157 (FIG. 25). Shelf 156 is moved from its solid line position to its phantom position by rotating hinge pin 157 with arm 158. Arm 158 is connected to link 159 at one end of bell crank 160. Bell crank 160 is pivoted to the frame at 161 and is spring biased to hold the shelf upward in its closed position. The other end of bell crank 160 carries a follower 162 which engages a cam 150 rotated by shaft 209. Movable along the shelf are a plurality of spaced pusher plates 163, these being mounted by arms 164 on a chain 166 trained across the rear of the machine between gears 167 and 168. As has been mentioned, shelf 161 slopes upwardly from right to left at an angle of 2° to 3° so that pears on the shelf are forced by gravity against a pusher plate and do not roll ahead of the pusher plate.

Figure 22:
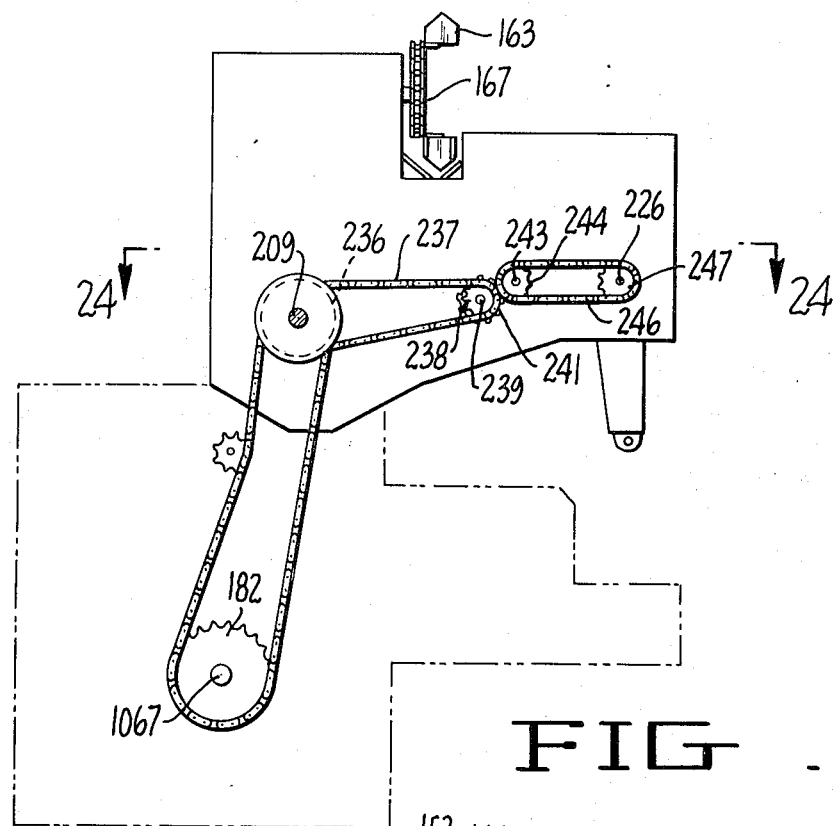
FIG. 22 is a fragmentary side elevation of a portion of the drive mechanism.

Gear 168 is mounted upon a shaft 169 which, in turn, is supported on the frame of the machine. Shaft 169 is driven by a gear box 171 (FIGS. 5 and 23), the latter receiving power from shaft 172 mounted in the gear box and in a bearing 173 mounted on the frame of the machine. Sprocket 174 is mounted upon shaft 172 and a chain 176 is trained about the sprocket. The chain 176 also passes about sprocket 177 (FIG. 23), the latter being mounted on one end of shaft 209 which extends across the machine at its other end (FIG. 22). The shaft 209 has a sprocket about which a chain extends from sprocket 182 mounted on the main drive shaft 1067 of the machine.

The pears ride along the shelf 156 being advanced by the pusher plates 163. The usual pear machine with which the orientor of this invention is associated, as is shown in the beforementioned patents, customarily includes six stations at each of which the six pears are simultaneously peeled and cored. Thus, at the instant that six pears are being advanced along shelf 156 by the associated pusher plates 163, the timing of the machine is such that the instant when the six pears on the shelf are properly aligned, the shelf 156 is moved from the full line position in FIG. 7 to the dotted line position so that each pear rolls off the shelf and into a modified V-shaped chute, generally designated as 186, and extending downwardly at an angle of about 35°. The chute is made of stainless steel and its upper end 187 provides a bare metal surface for engagement with the pear. The lower portion of the chute 188, however, is covered with Teflon. I have found that if the chute is made entirely of stainless steel, pears will hang up on the stainless steel, or if the chute is placed at a steeper angle than 35°, other pears will tumble end-over-end in a random manner. With the upper portion of the chute usually comprising stainless steel and the remainder covered with Teflon, sufficient resistance is presented to the downward passage of a pear so that the pear is turned by gravity into a position in which the stem end extends downwardly and forwardly, and the pear slides in a predictable stem forward position into the remainder of the machine wherein final orientation is effected. This means includes an inverted conical concave back piece 191. Mounted near the top and sloping to one side of the back piece is angled pivot plate 192. A pair of side plates 193a and 193b are pivotally carried adjacent back piece 191 and form an open faced cup therewith. The side plates are carried on shafts 194a and 194b which extend through cross frame member 196 and carry arms 197 and 198. Arm 197 is slotted as at 199 while arm 198 carries a pin 201 which rides in the slot to form an equalizing link between the cup side plates. Spring 202 extends between the ends of each arm to bias the side plates toward a closed position around the back piece 191.

As the pear exits from the chute 186 to engage the back piece 191 and the pivot plate 192, its further movement is stopped by plunger 203 which is then in the dotted line position shown in FIG. 7. A deflector plate 205 is carried above plunger 203. The plunger is moved between the full line position in FIG. 7 to the dotted line position in FIG. 7 in which latter position it has just ejected a pear into a transfer cup 204. Each plunger is supported on crossbar 206 (FIG. 24) which extends across the machine and which is supported on one end of arms 207a and 207b on opposite sides of the machine. The arms are secured to cross shaft 205 which is rocked by cam 208 on shaft 209 so that the plungers are moved between the lowermost dotted line position in FIG. 7 and the upper full line position. Each of the arms 207 carries a cam follower 211 engaged with the cams 208.

The side plates 193 are releasably locked against the back piece to form a rigid cup in which the pear is rotated with the stem end downward and then released to allow the oriented pear to be pushed between them. Lock fingers 212 have cam rollers 213 at their outer ends which engage the outside surfaces of the side plates. The fingers are moved from a locked position shown in solid line in FIG. 7 to an unlocked position shown in dotted line by rocking shaft 214. Shaft 214 is connected to shaft 205 by arm 215 and adjusting link 216. Shaft 205 is rocked by cam 208 as mentioned herebefore. Cam 208 controls both the action of the plunger and cup locks such that the cups are unlocked when the plunger is descending.

Figure 26:
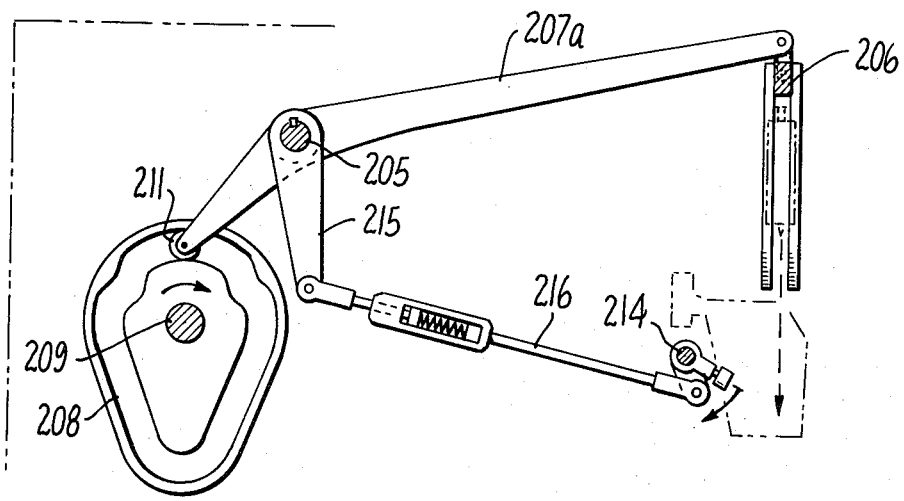

Before the pear is ejected into the transfer cup 204, several devices are brought to bear on it to ensure the proper stem end down orientation. If a pear exits from the chute stem first, it will slide smoothly between the elliptical pivot plate and the plunger hanging momentarily between the two while the plunger is in its lower position. The plunger is then raised to the position in which it appears in FIG. 26. The cam track on cam 208 is such that when the plunger is in its raised position, the plunger is reciprocated several times over a short path to dislodge any pear which may have hung up between the plunger and the chute 186. When the plunger moves out of engagement with the pear and is retracted to its full line position, the pear slides below the pivot plate 192 and will come into engagement with dependeng rod 217 which is supported at its upper end in an elongated slot on crossbar 218 so that the rod can be moved fully from side to side as will be explained.

Figure 17:
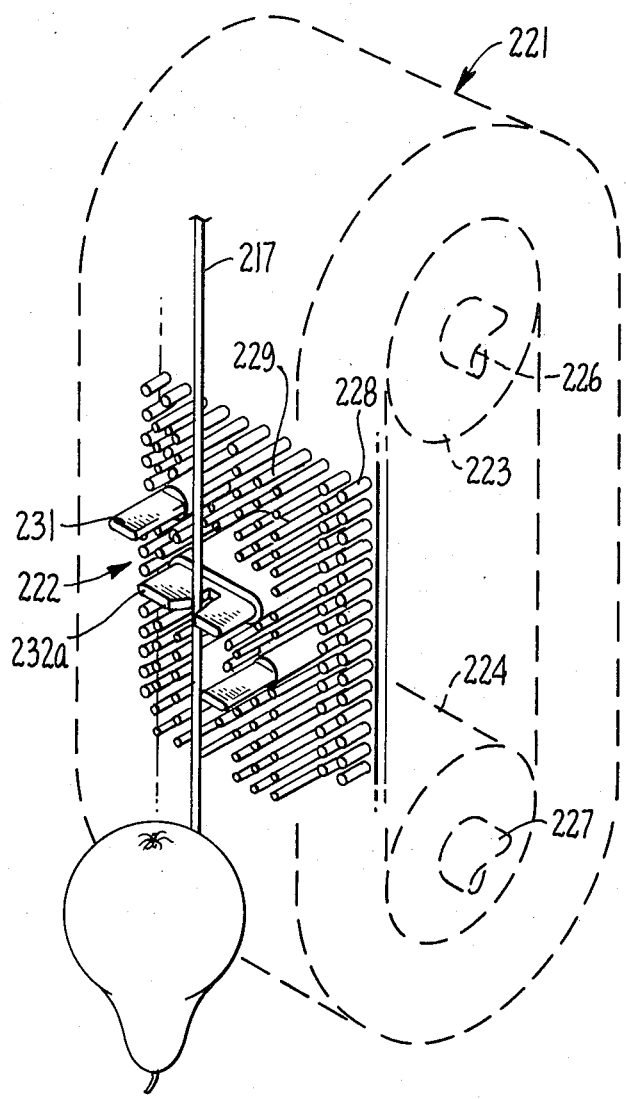
FIG. 17 is a perspective view showing a portion of the belt mechanism utilized to orient a pear.
Figure 20:
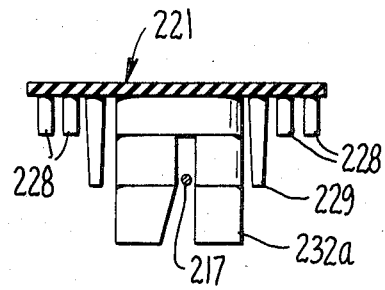
FIGS. 19 and 20 are sections taken along the respective section lines 19—19 and 20—20 in FIG. 18.
Figure 19:
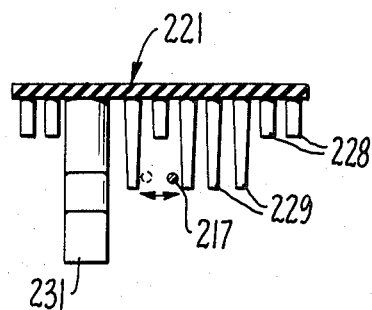
Figure 21:
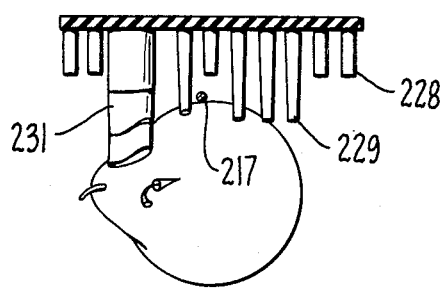
FIG. 21 is a schematic view illustrating the pear undergoing orientation.
Figure 18:
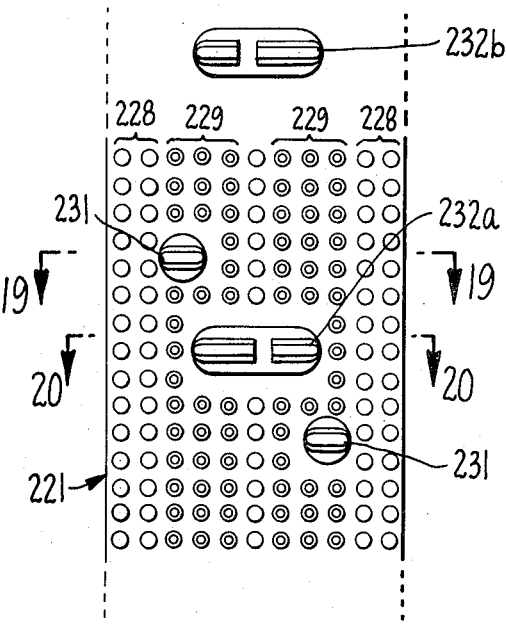
FIG. 18 is a partial front elevational view of a portion of the orienting belt.

Mounted opposite the lower chute 191 is a belt, generally indicated at 221, having a plurality of outwardly extending fingers, generally designated at 222 thereon. The belt is trained about upper and lower rollers 223 and 224 mounted respectively on shaft 226 and 227 as appears in FIGS. 17, 18 and 19. Each belt 221 includes a plurality of relatively short projecting fingers 228 on each side edge thereof. Intermediate the short fingers I provide a plurality of fingers 229 which are approximately twice the length of the short fingers 228, while spaced at intervals about the periphery of the belt are wider fingers 231 extending beyond fingers 229 and which are approximately twice the width thereof. In the central region of the belt, I provide a plurality of slotted fingers 232a and 232b also projecting beyond fingers 229. The slots in each of the adjacent pairs of fingers 232a and 232b are offset with respect to one another so that the rod 217 which is engaged with the slot in fingers 232a and 232b is moved from side to side and so rocks the pear. The effect of the fingers rubbing the pear is to cause the pear to pivot about its bulb end until the stem is turned downward. In FIGS. 17 and 18 only one segment of the belt is shown, the other segments being multiples thereof except for the placement of the slot in fingers 232a and 232b which is shifted between adjacent pairs of segments to swing rod 217.

Shaft 226 is rotated by rotating shaft 209 (FIG. 22). The shaft 209 has a sprocket 236 thereon and a chain 237 is trained about that sprocket and another sprocket 238 carried on a stub shaft 239 mounted on the frame of the machine and a gear 241 is also mounted on the stub shaft 239 and rotated with the sprocket 238. Gear 241 is engaged with another gear 242 which is also mounted on another stub shaft 243. Gear 242 is joined to a sprocket 244 about which chain 246 is trained to rotate sprocket 247 on shaft 226.

If the pear should rotate into a completely misoriented position, that is, with its bulb down, the neck of the pear comes to rest against the depending rod 217. Since the rod is being moved laterally back and forth about a half inch by the offset slots in slotted fingers 232, the rod dislodges the neck of the pear from resting against the rod stem up and in the misoriented position. With the pear resting against the rod 217, the conical back section 191 and the plates 193, the pear is engaged by one or more projections on the movable belt 221, the effect being to turn the pear from its vertical stem up position to a vertical stem down position.

At the end of the orienting cycle, the plunger 203 is moved from its raised position to engage the pear. To hold the pear in position, a pin 251 is provided in the end of the plunger to stab the pear, and so hold it in position, ensuring that there is no lateral movement and chance of misorientation during subsequent transfer.

Figure 16:
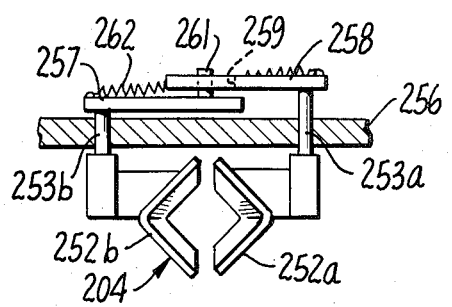

At the end of the orienting cycle, the plunger descends and pushes the pear downward to engage three spring loaded sections of the orienting unit. These move outwardly as the pear descends, but they always remain in contact with the pear, thus holding the pear in an oriented stem down position until the pear is seated in the transfer cup 204 (FIG. 16). Cup 204 comprises two triangular sections 252a and 252b, each mounted on a shaft 253a and 253b which extends through the crossbar 256 (FIG. 24). Each shaft carries an arm 257 and 258. Arm 258 is slotted as at 259 while arm 267 carries a pin 261 which rides in the slot. Spring 262 is extended between the end of each arm so that two halves of the transfer cups are biased toward one another to ensure that the opposite halves of the transfer cup hold a pear in oriented position.

Figure 27:
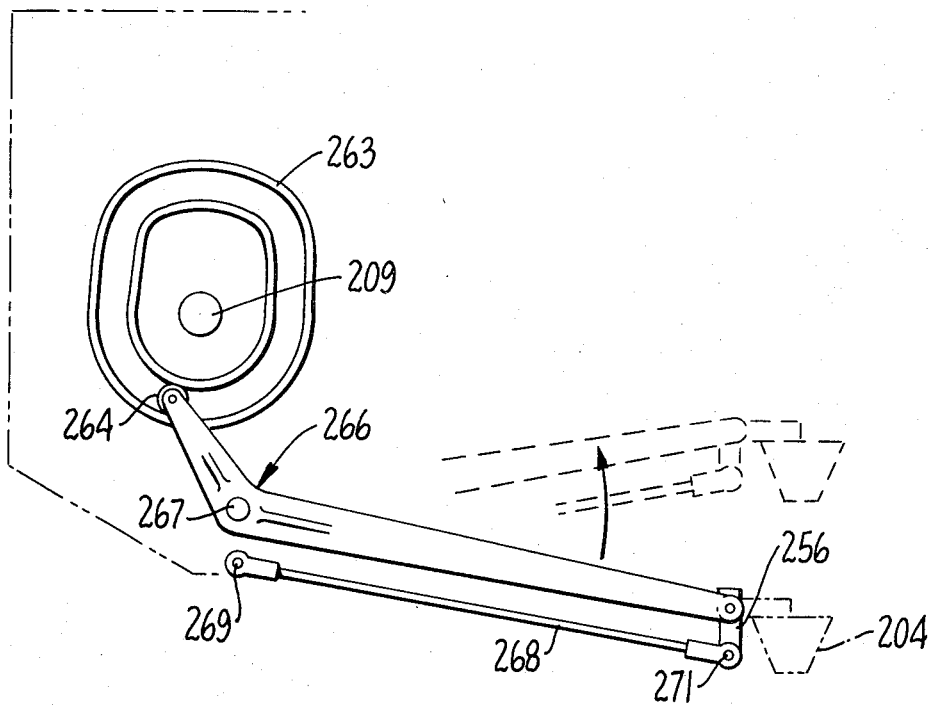

With the pear seated in the transfer cup, the latter is lowered to a position in which the pear can be transferred to the conical cup heretofore referred to as shown at 65 in FIG. 3 of U.S. Pat. 3,018,179. This is achieved by a pair of elevator mechanisms each including a cam 263 (FIG. 27) mounted upon shaft 209. A cam follower 264 rides in the track in the cam 263. The cam follower is pivoted upon one end of bell crank 266 which is pivoted at 267. At the opposite end of the bell crank the crossbar 256 is mounted. The crossbar and cups are held in vertical alignment by link 268, which is hinged as at 269 on the frame of the machine, the opposite end being connected at 271 with cross member 256.

Figure 28:
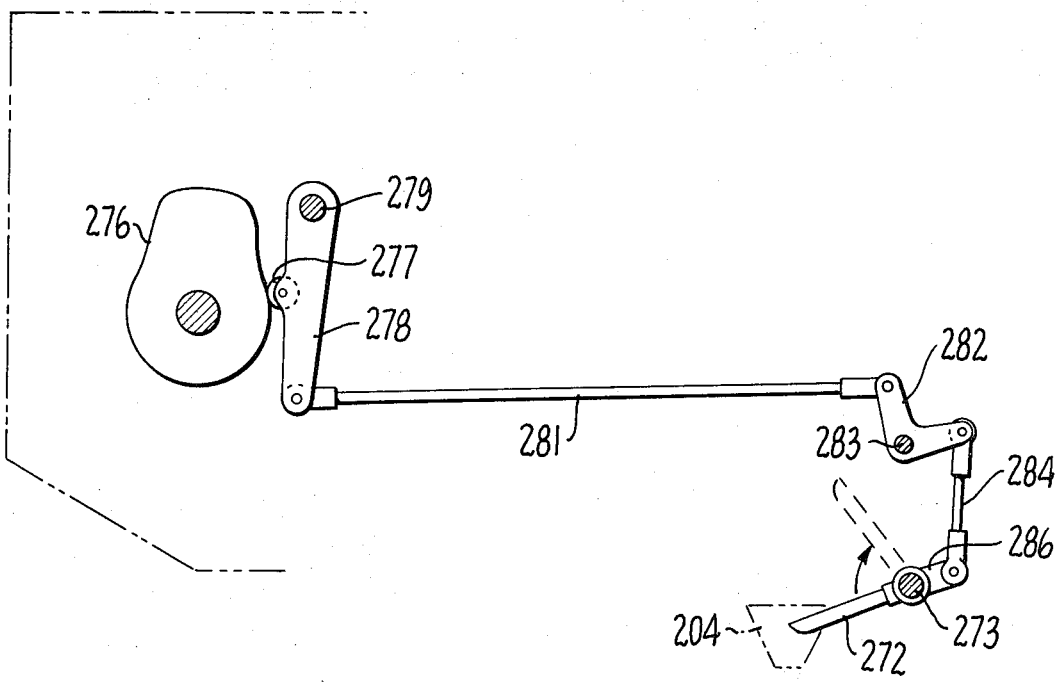

At the same time that the transfer cup is being lowered, the finger 272 is rocked counterclockwise as appears in FIG. 28. Each of the fingers is mounted upon shaft 273 and includes a spring 274 biasing the finger into a position such that, irrespective of the length of the pear, the finger accommodates itself to such length. The movement of each finger is accomplished by cam 276 mounted upon shaft 209. Cam follower 277 rides against the cam, the cam follower being carried intermediate the ends of a lever 278 which is pivoted as at 279 at one end. The other end of the lever is connected by a rod 281 to one arm of the bell crank 282 pivoted as at 283, the other end of the bell crank being connected by link 284 to arm 286 mounted on the shaft 273. Thus, the pear is held firmly by the finger 272 while the transfer cup is raised. The spring loaded portion of the transfer cup slides smoothly past the pear, the transfer cup being raised to receive another pear from the orienting unit.

I claim:

1. A pear orienting apparatus, comprising a conveyor means, means to supply pears to the conveyor means, downwardly inclined chute means with an upper end portion thereof adjacent said conveyor means, means to discharge pears from the conveyor means to the chute means, the upper end portion of said chute means having a first frictional resistance to sliding movement of a pear therealong so that a pear moving down said chute means is oriented to substantially a stem downward position, a lower end portion of said chute means being treated to have a frictional resistance to sliding movement of a pear therealong less than said first frictional resistance so that the stem downward orientation of said pear is maintained, without tumbling of said pear, as said pear moves along the lower portion of said chute means, and means to receive said pear from said chute means to perform subsequent operations on said oriented pear.

2. A pear orienting apparatus as in claim 1, wherein said means to receive a pear from the chute means includes further pear orienting means, said further pear orienting means comprising a chute extension downwardly inclined from a lower end of said chute, gate means operatively associated with said chute extension to stop advancement of a pear therealong until said pear is properly oriented, substantially vertically movable endless belt means adjacent said chute extension and including a plurality of fingers thereon engageable with a pear on said extension, a vertically disposed, elongate rod engageable with the fingers of the belt and movable laterally thereby, said rod engageable with said pear, and a vertically reciprocable plunger adjacent said chute and extension to engage a pear on said extension, said plunger, said rod, and said fingers on said belt all cooperating to properly orient a pear supported on said extension.

3. A pear orienting apparatus comprising downwardly inclined chute means having an upper end and a lower end and upstanding sides, the upper end of the chute means having a first frictional resistance to movement of a pear therealong so that a pear moving down said chute means is oriented to substantially a stem downward position, the lower end of said chute means being treated to have a second frictional resistance to movement of a pear therealong which is less than said first frictional resistance so that the stem downward orientation of said pear is maintained as said pear moves along the lower portion of said chute means, and means adjacent the lower end of the chute means, including power operated means, to receive a pear from the chute means and orient any pear which is not properly oriented by the chute means to a substantially stem downward position.

4. A pear orienting apparatus comprising downwardly inclined chute means having an upper end and a lower end, means to feed pears to the upper end of the chute means, a chute extension inclined downwardly from the lower end of the chute means to receive a pear from the chute means, power operated gate means adjacent the chute extension to retain a pear on the chute extension, and power operated pear orienting means adjacent said chute extension and engageable with a pear on said chute extension to orient said pear to a substantially stem downward position, said gate means operable to release said pear from said chute extension when said pear is properly oriented.

5. A pear orienting apparatus comprising downwardly inclined chute means having an upper end and a lower end, a chute extension adjacent the lower end of the chute means and inclined downwardly therefrom, a power operated, substantially vertically reciprocable plunger adjacent said chute means and chute extension and engageable with a pear on said chute extension, a substantially vertically movable, power operated belt means adjacent said chute extension, a plurality of pear engaging fingers on said belt means, and a substantially vertically disposed, elongate, pear engaging rod between said belt means and said chute extension and in engagement with said fingers and laterally movable thereby, said chute, said chute extension, said plunger and said fingers all operable to orient a pear engaged thereby to a substantially stem downward position.

6. A pear orienting apparatus as in claim 3, wherein said means to receive a pear from the chute means includes a chute extension adjacent the lower end of the chute means and inclined downwardly therefrom, a pair of angularly outwardly extending lock plates on opposite sides of said chute extension, a substantially vertically movable plunger adjacent said chute extension and movable substantially vertically between said lock plates into and out of engagement with a pear on said chute extension, said chute extension, said lock plates and said plunger comprising a gate means to retain a pear on said chute extension and to orient said pear to a substantially stem downward position, and power operated means operatively connected with said lock plates to release said lock plates and enable them to move away from said chute extension when said plunger is out of engagement with said pear to release said pear from said chute extension.

7. A pear orienting apparatus as in claim 6, wherein a substantially vertically movable, power operated belt is supported adjacent said chute extension in confronting relationship thereto, a plurality of fingers on said belt extending between said lock plates toward said chute extension into engagement with said pear supported on said chute extension and operable to aid in orienting said pear.

8. A pear orienting apparatus as in claim 7, wherein an elongate, substantially vertically disposed, pear engaging rod is supported between said belt and said chute extension, said fingers engaged with said rod to impart lateral movement to said rod to aid in orienting a pear engaged thereby.

9. A pear orienting apparatus as in claim 3, wherein the upper end of said chute means comprises stainless steel, and the lower end of said chute means is coated with Teflon.

10. A pear orienting apparatus as in claim 3, wherein the chute means is substantially V-shaped in transverse cross section, said upstanding sides being arcuately shaped.

11. A pear orienting apparatus as in claim 6, wherein a pointed extension is on a lower end of the plunger to engage an oriented pear and maintain the orientation of the pear when it is transferred from the chute extension to a transfer cup.

12. A pear orienting apparatus as in claim 7, wherein the fingers are flexible.

13. A pear orienting apparatus as in claim 11, wherein a transfer cup is supported adjacent a lower end of said chute extension to receive a pear therefrom, said transfer cup including a plurality of separate side walls spring biased toward one another to hold a pear in place in the cup.

14. A pear orienting apparatus as in claim 13, wherein a spring biased finger is movably positioned adjacent and above said cup to engage and press a pear in the cup against the cup side walls.

* * * * *